Figures 1, 2, 3:
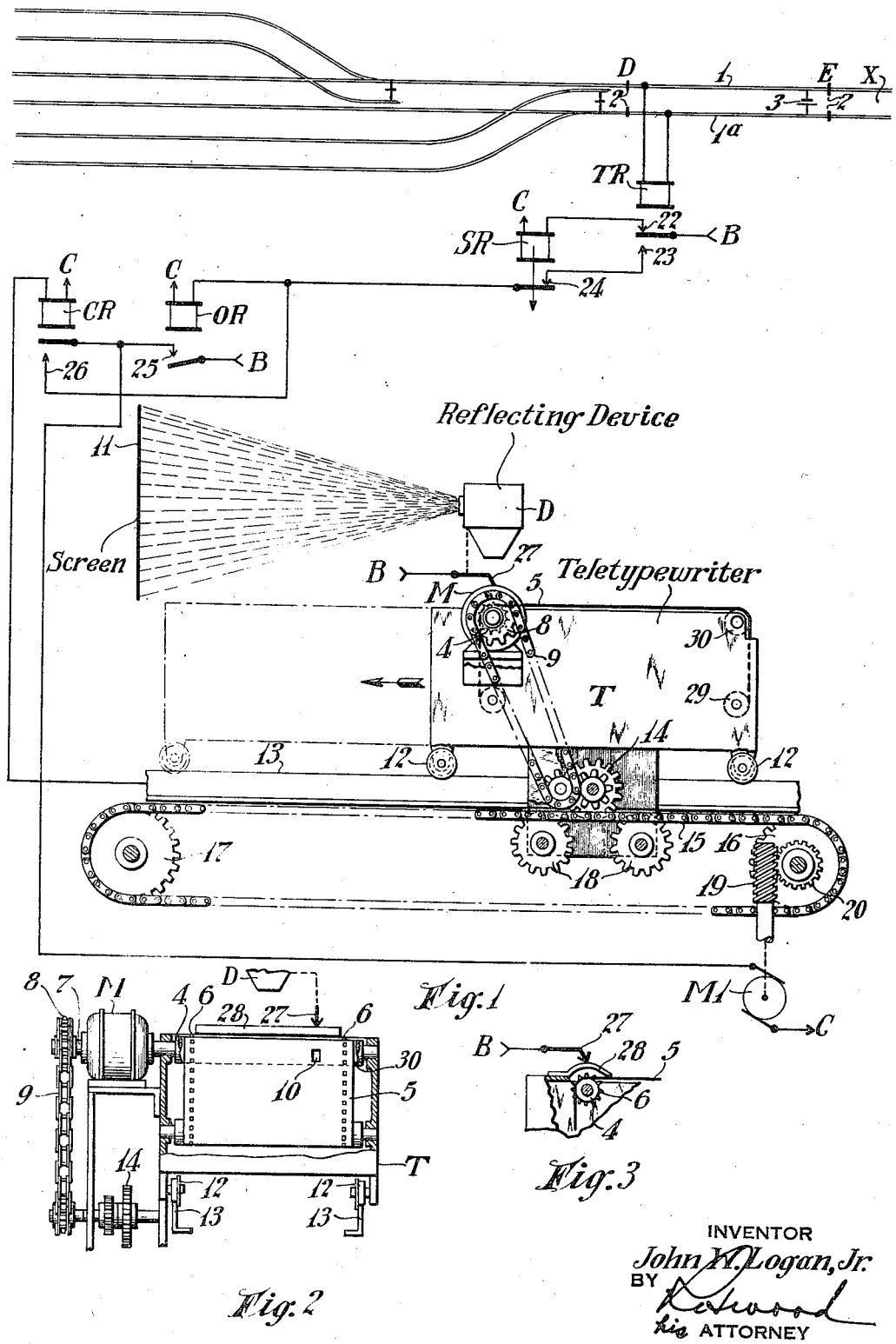

Oct. 31, 1939.  J. W. LOGAN, JR  2,178,284

ANNUNCIATING APPARATUS

Filed Sept. 15, 1938

INVENTOR
John W. Logan, Jr.
BY
his ATTORNEY

Patented Oct. 31, 1939

2,178,284

UNITED STATES PATENT OFFICE 2,178,284

ANNUNCIATING APPARATUS

John W. Logan, Jr., Forest Hills, Pa., assignor to The Union Switch & Signal Company, Swissvale, Pa., a corporation of Pennsylvania Application September 15, 1938, Serial No. 230,160

16 Claims. (Cl. 246—124)

My invention relates to annunciating apparatus, and particularly to apparatus capable of receiving a plurality of indications relating to the sequence in operation of a series of several successive events or objects.

A feature of my invention is the provision, in annunciating systems for receiving and recording in the sequence in which received a plurality of different indications, of novel and improved means for displaying the indications in the sequence in which they are recorded. A further feature of my invention is the provision of apparatus for automatically cancelling the display of such indications one at a time when the corresponding event is acted upon, and for automatically placing on display an indication corresponding to another event yet to be acted upon. Other features and advantages of my invention will appear as the specification progresses.

Annunciating apparatus of the character described is particularly well adapted for indicating the sequence of arrival of objects or vehicles successively approaching a selected point, wherewith means is provided for cancelling the indication concerning each object when the object with which it is related arrives at the point, and for progressing the indications recorded so that the sequence of objects approaching the point is at all times displayed in the order at which the objects are to arrive.

Apparatus embodying my invention is particularly well adapted for, but not limited to, train annunciating systems for indicating at a remote point the sequence in which trains are to arrive at another point.

I shall describe one form of apparatus embodying my invention, and shall then point out the novel features thereof in claims.

In the accompanying drawing, Fig. 1 is a diagrammatic view showing one form of apparatus embodying my invention when applied to a train annunciating system. Figs. 2 and 3 are diagrammatic views each showing a portion of the apparatus of Fig. 1.

In each of the several views, similar reference characters refer to similar parts.

Referring to Fig. 1, the reference characters 1 and 1ª designate the traffic rails of a stretch of railway track X. Track X is divided by means of the usual insulated track joints 2 into a track section D—E, the section being provided with a track circuit comprising a suitable source of current, such as track battery 3, connected across the rails at one end of the section and a track relay TR connected across the rails at the other end. While section D—E may be any control section provided for track X, as here shown section D—E is the approach section provided for the outer limits of an interlocking plant.

In order to indicate at a remote point, which may for example be the control tower of the interlocking plant, the sequence in which trains are to arrive at section D—E, I provide at such remote point annunciating apparatus comprising signal receiving apparatus, display means and means for governing the position of the signal receiving apparatus with respect to such display means. The signal receiving apparatus may be any one of the well-known forms of printing telegraph instruments, and as here shown is a teletypewriter, designated by the reference character T. Teletypewriter T is adapted to receive character impulses over a line or radio network and, after translating such impulses into characters, record such impulses in the form of visual indications. In accordance with the usual practice, such impulses will usually be dispatched from a control station (not shown) located along track X in the rear of section D—E and the interlocking plant. The impulses thus sent out from the control station will usually be adapted to indicate the sequence in which trains are dispatched on track X from the control station to the interlocking plant, and will usually indicate the route designation of each train, thus permitting the operator of the interlocking plant to set up the proper route for each train prior to the arrival of the train upon section D—E.

Teletypewriter T is shown (Fig. 2) provided with a horizontal transverse feed roller or platen 4 which supports and feeds an elongated perforated sheet or record tape 5, this tape being wide enough to contain longitudinal series of character imprints in the form of train orders or train destination indications. The platen 4 is provided, at its ends, with feed pins 6 to maintain correct registration of the tape. The tape 5 is advanced in a direction opposite that shown by an arrow (Fig. 1) by any suitable means, such as motor M, adapted to rotate platen 4. An extension of shaft 7 of motor M coacts with a gear 8 to actuate a sprocket chain 9. Teletypewriter T is preferably provided with a punch key, or other suitable means not shown, for providing a perforation 10 in tape 5, there being preferably a perforation for each train message.

Referring once more to Fig. 1, the display means for exhibiting or displaying a portion of tape 5 and the indications recorded thereon includes a reflecting device D and a screen 11.

The display device D may be any form of device capable of reproducing on screen 11 the indications recorded on tape 5, and as here shown is a reflecting device of the usual and well-known form.

Teletypewriter T and reflecting device D are preferably arranged and disposed so that teletypewriter T may receive and record indications upon tape 5, with the reflecting device and the portion of tape 5 displayed by the reflecting device remaining in the same relative position. While any suitable arrangement may be employed to maintain a selected portion of tape 5 in the same relative position with respect to device D, in the form of apparatus shown in the drawing, the teletypewriter T is provided with suitable supporting members 12 cooperating with rails 13 so that teletypewriter T may be freely moved along the rails. Teletypewriter T is also provided with a sprocket gear 14 suitably journaled in the frame of teletypewriter T and cooperating with a sprocket chain 15. Sprocket chain 15 is provided with sprocket gears 16 and 17 over which chain 15 operates, and which normally hold chain 15 stationary. Idler gears 18, 18 may also be suitably journaled in the frame of teletypewriter T, and so arranged and disposed as to maintain chain 15 in engagement with gear 14. Teletypewriter T is further provided with means for actuating sprocket gear 14, which gear is normally locked against rotation by means not shown, and which is rotated by chain 9 interconnected through gear 8 with motor M, the arrangement being such that when platen 4 is actuated by motor M to advance tape 5, sprocket gear 14 is also actuated by virtue of its interconnection with motor M so that teletypewriter T is moved along rail 13 in the direction shown by the arrow in Fig. 1. It follows that, sprocket chain 15 remaining stationary, motor M of the advancing mechanism for teletypewriter T actuates tape 5 in one direction with respect to teletypewriter T, and actuates sprocket gear 14 so as to move teletypewriter T in an opposite direction with respect to display device D. The parts will usually be so proportioned that the distance tape 5 is moved by motor M, with respect to teletypewriter T, substantially equals the distance that teletypewriter T is moved by motor M with respect to device D, so that the relative position of a selected portion of tape 5 with respect to the display device D remains fixed.

The portion of tape 5 reproduced on screen 11 by device D is governed by the relative position of the display device and tape 5, which relative position may be altered by a suitable operating means capable of producing relative motion between tape 5 of teletypewriter T and display device D. In the particular form of apparatus illustrated in the drawing, relative motion between tape 5 and device D is obtained by moving teletypewriter T, device D remaining fixed. To obtain this relative motion, I provide sprocket chain 15 with a suitable form of operating means, such as, for example, a motor M1 preferably provided with a magnetic brake for preventing overrun, operating through a train of gears 19—20 to actuate sprocket gear 16 and sprocket chain 15, the arrangement being such that when motor M1 is energized, sprocket gear 16 is actuated in a clockwise direction to actuate sprocket chain 15. It follows that since sprocket gear 14 of teletypewriter T is maintained in engagement with chain 15 and is normally locked against rotation, a movement of chain 15 induces a corresponding movement of teletypewriter T with the result that teletypewriter T moves with respect to display device D. It is to be understood, of course, that the scope of my invention embraces any suitable means to obtain relative motion between teletypewriter T and device D and is not restricted to moving teletypewriter T, device D remaining fixed.

The reference character SR designates a slow release relay which is energized over a simple circuit including front contact 22 of the control track relay TR.

The reference character OR designates an operating relay which is provided with a pick-up circuit including back contact 23 of relay TR and front contact 24 of relay SR, and with a stick circuit including front contact 25 of relay OR and back contact 26 of a relay CR to be referred to later. Motor M1 of the operating means for chain 15 is energized at such times as front contact 25 of relay OR is closed.

Relay CR, referred to previously, is energized whenever a contact 27, associated with the display device D, is permitted, by perforations 10 in tape 5 associated with each indication, to make contact with the frame of teletypewriter T, the circuit for relay CR passing from terminal B of a suitable source of current, such as a battery not shown, through contact 27 and the frame of teletypewriter T, rail 13, and the winding of relay CR to terminal C.

In describing the operation of the apparatus embodying my invention, I shall assume that no train is operating on section D—E so that relays TR and SR are energized, and relay OR is deenergized. I shall further assume that a suitable portion of tape 5 is desired to be exhibited upon screen 11 so that only a few, for example 3, train indications appear visible upon the screen. As will appear more clearly hereinafter, these indications will usually relate to the next three trains due to arrive upon section D—E of track X. In order to agree with the above assumed number of train messages reproduced upon screen 11, device D and teletypewriter T will be initially so positioned, when no indications have been received relating to trains arriving at section D—E, that device D reproduces no portion of tape 5 upon screen 11, a suitable metallic covering 28 for teletypewriter T being interposed beneath device D. Contact 27 of device D now engages cover 28 of teletypewriter T (Fig. 3) so that relay CR is energized.

When a first indication is received by teletypewriter T relating to a train movement, the indication is recorded upon tape 5 by the teletypewriter, a suitable portion of tape 5 is perforated or cut away (the punch mark 10 being preferably in line with its associated indication) and tape 5 is advanced when motor M is energized so that a succeeding indication may be received and recorded by the machine, tape 5 being wound by any suitable means, such as, for example, a spring wound collector reel 29, upon reel 29 so that tape 5 remains taut. When motor M actuates platen 4 to advance tape 5, the first indication recorded upon tape 5 is advanced clear of the cover 28, and when sprocket gear 14 coacts with motor M to move teletypewriter T, contact 27 of device D breaks engagement with cover 28 but is permitted by the perforation 10 in tape 5 to contact the frame of teletypewriter T so that relay CR remains energized. Tape 5 is now positioned so that device D reproduces the first indication on screen 11. It follows that motor M moves tape 5 in a first direction with respect to device D and that motor M moves teletypewriter T a like distance in the opposite direction with respect to device D, so that the position of any one selected point of tape 5 remains fixed with respect to device D.

When a second indication is received by teletypwriter T, the indication is recorded upon tape 5, the tape is advanced clear of the teletypewriter cover 28, and teletypewriter T is moved by gear 14 a distance equal to the advancement of tape 5, so that the first and second indications are now reproduced on screen 11 by device D. When a third indication is received, the indication is recorded, the tape is advanced, and the teletypewriter is moved with respect to device D with the result that the first, second and third indications are now displayed by device D on screen 11. When a fourth, and any subsequent, indication is received by teletypewriter T, the indication is recorded, the tape is advanced and the teletypewriter is moved by sprocket gear 14 in a manner similar to that described for the first three indications. However, to agree with the assumption that only three indications are desired to be reproduced on screen 11 at any one time, device D is preferably so proportioned and arranged that the portion of tape 5 reproduced by device D on screen 11 permits only three indications to be reproduced. It can be seen, therefore, that while any number of indications may be received and recorded by teletypewriter T, the number being limited only by the length of tape 5 between platen 4 and roller 30, only a selected number of indications are displayed by device D; the portion of the tape reproduced by device D, and device D, remaining in the same relative position with respect to each other.

When a train, operating on track X, arrives at section D—E, relay TR becomes released to open front contact 22 and thereby open the energizing circuit for relay SR, and to close back contact 23 to complete the pick-up circuit for relay OR. Relay OR picks up, and closes front contact 25 to complete the energizing circuit for motor M1. The actuation of motor M1 operates sprocket gear 16 so as to actuate sprocket chain 15, the actuation of the latter moving teletypewriter T in the direction the reverse of that shown by the arrow in Fig. 1. The movement of teletypewrite T (and the correspondent movement of tape 5) causes tape 5 to interrupt at contact 27 the previously traced circuit for relay CR with the result that relay CR releases to close back contact 26 and complete the stick circuit for relay OR. When relay SR releases at the end of its slow release period to interrupt the pick-up circuit for relay OR, relay OR is held energized by virtue of its stick circuit until a perforation 10 in tape 5 again permits contact 27 to engage the frame of teletypewriter T and reenergize relay CR. When relay CR picks up, relay OR releases to interrupt the energizing circuit for motor M1, and to terminate the actuation of sprocket gear 16 and teletypewriter T. At this point, teletypewriter T and tape 5 will have moved with respect to device D so that the first indication is no longer reproduced by device D, which now displays the second, third and fourth indications upon screen 11. It follows that a train, reaching a selected point, automatically cancels the display of the indication concerning that train reproduced on screen 11, and causes an indication relating to a subsequent train to be displayed.

It should be pointed out that the perforations 10 provided in tape 5 in line with each indication serve to control the distance that teletypewriter T is moved by the operating means for chain 15. In the event that an erroneous indication is sent by an operator, and is received and recorded by the teletypewriter, the indication may be in effect "cancelled" when the sending operator permits tape 5 to be advanced by the teletypewriter without providing a perforation 10 for that indication. The correct indication may then be sent by the operator, and a perforation 10 provided in tape 5 associated with that indication. It follows that although the erroneous indication may be displayed on the screen by the display device in the third or second "next to arrive" position, the erroneous indication is never positioned in the first "next to arrive" position since the absence of a perforation in the tape corresponding to that indication permits the tape to be moved until the correct indication is positioned in the first "next to arrive" position. It can be seen, therefore, that indications relating to the movement of trains may be at all times retained in the proper sequence at which the trains are to arrive at the selected point.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In an annunciating system for indicating at a remote point the arrival of objects at another point the combination of, a teletypewriter provided with a record tape and capable of receiving and recording on said tape intelligence concerning said objects, display means effective to display a portion of said tape and the intelligence recorded thereon, operating means to effect relative motion between said tape and said display means, control means adapted to being controlled by objects arriving at said other point, and means governed by said control means for governing said operating means.

2. In an annunciating system for indicating at a remote point the arrival of trains at another point, the combination of, a teletypewriter having a record tape, said teletypewriter being adapted to receive and record indications concerning trains on said tape, display means capable of displaying a portion of said tape, said display means and said tape capable of relative motion, a control relay controlled by trains arriving at said other point, and means governed by said control relay to control the relative position of said tape and said display means.

3. Train annunciating apparatus comprising, a record tape, a teletypewriter capable of receiving and recording on said tape a plurality of train orders each relating to a different train, a display device for displaying a selected portion of said tape, means controlled by said teletypewriter for maintaining said tape in fixed relation with said display device, a control relay adapted to being controlled by trains, and means governed by said control relay for moving said tape with respect to said display device.

4. In an annunciating system for indicating at a remote point the arrival of trains at another point, the combination of, a teletypewriter provided with a record tape and capable of receiving and recording on said tape intelligence concerning trains, display means associated with said teletypewriter and effective to display a portion of said tape, operating means effective to move said tape with respect to said display means, a control relay controlled by trains arriving at said other point, and means governed by said control relay for controlling said operating means.

5. In an annunciating system for indicating at a remote point the arrival of trains at another point the combination of, a teletypewriter provided with a record tape and capable of receiving and recording on said tape intelligence concerning trains, a screen, a display device effective to reproduce on said screen a selected portion of said tape and the intelligence recorded thereon, operating means effective to move said tape with respect to said display device, a control relay controlled by trains arriving at said other point, and means governed by said control relay for governing said operating means.

6. In a train annunciating system, signal receiving apparatus having a record tape and being effective to receive and record on said tape a plurality of different train orders, each order relating to the movement of a different train, display means effective to display a selected portion of said tape and the orders recorded thereon, a control relay adapted to being actuated by trains, and means governed by said control relay when actuated by a train for cancelling an order on display relating to that train.

7. In a train annunciating system the combination of, a printing telegraph instrument having a record tape and capable of receiving and recording on said tape a plurality of indications, each indication relating to a different train, display means effective to display a selected portion of said tape and the indications recorded thereon, operating means effective to move said selected portion of said tape with respect to said display means, control means adapted to being actuated by a train, and means governed by said control means when actuated by a train for governing said operating means whereby an indication on display relating to that train is cancelled.

8. In a train annunciating system, the combination of, a printing telegraph instrument provided with a record tape and being capable of receiving and recording on said tape a plurality of indications, each indication relating to a different train, display means effective to display a selected portion of said tape and the indications recorded thereon, said display means and said tape being capable of relative motion, operating means for effecting relative motion between said tape and said display means, a control relay adapted to being actuated by a train, and means governed by said relay when actuated by a train for governing said operating means whereby an indication relating to that train is cancelled.

9. In an annunciating system for indicating at a remote point the sequence in which objects are to arrive at another point, the combination of, a teletypewriter having a record tape and being capable of receiving and recording indications on said tape concerning said objects, each indication relating to a different object, display means for displaying a selected portion of said tape and the indications recorded thereon, operating means for effecting relative motion between said display means and said record tape, control means adapted to being actuated by objects arriving at said other point, and means governed by said control means when actuated by an object for controlling said operating means.

10. In an annunciating system for indicating at a remote point the sequence in which trains will arrive at another point comprising, a printing telegraph instrument provided with a record tape and being capable of receiving and recording indications on said tape, each indication relating to a different train and each indication recorded in the sequence in which the related train is to arrive at said other point, display means effective to display a selected portion of said tape and the indications recorded thereon, means governed by said teletypewriter for maintaining said selected portion of tape and said display means in a predetermined position, operating means effective to alter the position of said selected portion of tape with respect to said display means, a control relay adapted to being actuated by trains arriving at said other point, and means governed by said control relay when actuated by a train for governing said operating means.

11. Annunciating apparatus for indicating at a remote point the sequence in which trains are to arrive at another point comprising, in combination, a printing telegraph instrument provided with a record tape and being capable of receiving and recording indications on said tape, each indication relating to a different train and the indication being recorded in the order in which the related train is to arrive at said other point, a screen, display means effective to reproduce on said screen a selected portion of said tape and a series of indications recorded thereon, means governed by said printing telegraph instrument for maintaining said selected portion of tape and said display means in a predetermined relation, operating means effective to alter said predetermined relation between said selected portion of tape and said display means, a control relay adapted to being actuated by a train arriving at said other point, and means governed by said control relay when actuated by a train for governing said operating means whereby an indication reproduced on said screen relating to that train is cancelled and a new series of indications is reproduced on said screen.

12. Annunciating apparatus for indicating at one point the sequence in which trains are to arrive at another point comprising, in combination, a printing telegraph instrument provided with a record tape and being capable of receiving and recording indications on said tape, each indication relating to a different train and the indication being recorded in the order in which the related train is to arrive at said other point, a screen, display means capable of reproducing on said screen a selected portion of said tape and a series of indications recorded thereon, operating means including a sprocket chain and a sprocket gear for moving said selected portion of tape with respect to said display means, a control relay adapted to being actuated by a train arriving at said other point, and means governed by said control relay when actuated by a train for governing said operating means to actuate said sprocket chain and gear whereby the series of indications reproduced on said screen is altered.

13. Apparatus for visibly announcing at one point the sequence in which trains are to arrive at another point consisting of, in combination, recording means having a record tape and being capable of recording on said tape identifying indications, each indication relating to a different train and the indications being recorded in the order in which the related trains are to arrive at said other point, display means capable of displaying a selected portion of said tape and the indications recorded thereon, and means governed by a train arriving at said other point for extinguishing the display of an indication relating to that train and for causing said display means to display an indication concerning the next train to arrive at said other point.

14. In an annunciating system, in combination, a record tape, recording means for recording indicia on said tape, tape advancing means for advancing said tape at the termination of each recording of an indicia, display means for displaying a selected portion of said tape and the indicia recorded thereon, means controlled by said tape advancing means effective to maintain said display means and said selected portion of tape in a predetermined relative position, and cancelling means effective at times to alter the predetermined relative position between said display means and said selected portion of tape.

15. Apparatus for indicating at a remote point the sequence in which trains are to arrive at another point, comprising, in combination, a tape capable of having recorded thereon indications concerning trains, said tape being movable through a plurality of successive positions one of which is a "next-to-arrive" position, recording means effective to record and store a plurality of indications upon said tape in the sequence in which trains are to arrive at said other point, and means controlled by the arrival of a train at said other point for moving said tape through its successive positions whereby an indication relating to that train is moved from said "next-to-arrive" position and another indication relating to the next train to arrive at said other point is moved into said "next-to-arrive" position.

16. Apparatus for indicating at a remote point the sequence in which trains are to arrive at another point, comprising, in combination, a tape capable of having indications concerning train movements recorded thereon, said tape being movable through a plurality of successive positions one of which is a "next-to-arrive" position, recording means effective to record indications concerning train movements upon said tape, means for moving said recording means with respect to said "next-to-arrive" position, whereby said recording means is effective to record and store a plurality of indications upon said tape in the sequence in which trains are to arrive at said other point, and means controlled by the arrival of a train at said other point for moving said tape through its successive positions whereby the indications recorded on said tape are moved into said "next-to-arrive" position one at a time.

JOHN W. LOGAN, Jr.